(12) United States Patent
Lai et al.

(10) Patent No.: US 11,037,158 B2
(45) Date of Patent: Jun. 15, 2021

(54) BULK DISPUTE CHALLENGE SYSTEM

(71) Applicant: Microsoft Technology Licensing, LLC, Redmond, WA (US)

(72) Inventors: Di Lai, Bellevue, WA (US); Zimin Zhong, Kenmore, WA (US); Qi Xue, Samammish, WA (US); Trevor Nies, Samammish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 729 days.

(21) Appl. No.: 15/224,580

(22) Filed: Jul. 31, 2016

(65) Prior Publication Data

US 2017/0286962 A1 Oct. 5, 2017

Related U.S. Application Data

(60) Provisional application No. 62/314,986, filed on Mar. 29, 2016.

(51) Int. Cl.
*G06Q 30/00* (2012.01)
*G06Q 20/40* (2012.01)
(Continued)

(52) U.S. Cl.
CPC ......... *G06Q 20/4016* (2013.01); *G06Q 20/24* (2013.01); *G06Q 20/34* (2013.01); *G06Q 20/407* (2013.01); *G06Q 30/0609* (2013.01)

(58) Field of Classification Search
CPC .................................................. G06Q 20/4016
(Continued)

(56) References Cited

U.S. PATENT DOCUMENTS 5,995,948 A * 11/1999 Whitford ............... G06Q 99/00
705/41
6,783,065 B2 8/2004 Spitz et al.
(Continued)

FOREIGN PATENT DOCUMENTS

WO 2002001523 A1 1/2002

OTHER PUBLICATIONS

"Characterizing and Preventing Chargebacks in Web Payment Services" (Year: 2014).*
(Continued)

*Primary Examiner* — Bruce I Ebersman
(74) *Attorney, Agent, or Firm* — Alleman Hall Creasman & Tuttle LLP

(57) ABSTRACT

In one example, a bulk dispute challenge system may select disputes to challenge from a bulk set of dispute events based on a probability of success and a return on investment. The bulk dispute challenge system may receive a dispute success model that calculates a predicted probability of success for disputes generated by applying a machine learning model to a training data set featuring multiple attributes describing data characteristics of disputed events. The bulk dispute challenge system may apply the dispute success model to a dispute of a dispute set. The bulk dispute challenge system may calculate a predicted probability of success for a dispute challenge. The bulk dispute challenge system may perform a dispute decision for the dispute based in part on the predicted probability of success and a dispute return on investment. The bulk dispute challenge system may execute the dispute challenge to the dispute based on the dispute decision.

18 Claims, 13 Drawing Sheets

(51) Int. Cl.
*G06Q 20/34* (2012.01)
*G06Q 20/24* (2012.01)
*G06Q 30/06* (2012.01)

(58) Field of Classification Search
USPC .......................................................... 705/44
See application file for complete search history.

(56) References Cited

U.S. PATENT DOCUMENTS

| | | | |
|---|---|---|---|
| 7,356,516 | B2 | 4/2008 | Richey et al. |
| 8,346,638 | B2 | 1/2013 | Phillips et al. |
| 8,515,792 | B2 | 8/2013 | Agarwala et al. |
| 10,546,302 | B2* | 1/2020 | Zovi ................. G06Q 20/3825 |
| 2002/0120559 | A1* | 8/2002 | O'Mara ................. G06Q 40/00 705/38 |
| 2003/0050788 | A1 | 3/2003 | Cranner |
| 2005/0108084 | A1* | 5/2005 | Ramamoorti .......... G06Q 10/06 705/70 |
| 2006/0031177 | A1 | 2/2006 | Rule |
| 2008/0154783 | A1 | 6/2008 | Rule et al. |
| 2010/0114774 | A1 | 5/2010 | Linaman et al. |
| 2010/0130172 | A1* | 5/2010 | Vendrow ............ G06Q 20/4016 455/411 |
| 2011/0313835 | A1* | 12/2011 | Falkenborg ........ G06Q 30/0224 705/14.25 |
| 2013/0297492 | A1 | 11/2013 | Ertresvaag et al. |
| 2014/0006264 | A1 | 1/2014 | Powell et al. |
| 2014/0156568 | A1 | 6/2014 | Ganguly et al. |
| 2014/0279312 | A1 | 9/2014 | Mason et al. |
| 2014/0379539 | A1 | 12/2014 | Doddavula et al. |
| 2017/0053278 | A1* | 2/2017 | Gerard ................. G06Q 20/407 |

OTHER PUBLICATIONS

Hakim, et al., "Architecting a Machine Learning System for Risk", In Publication of Code, Jun. 16, 2014, 20 pages.

Mcclure, Grace, "7 Tips to Reduce Your Merchant Fraud and Chargebacks", Available at: <<https://blog.trycelery.com/7-tips-to-reduce-your-merchant-fraud-and-chargebacks/>>, May 27, 2015, 13 pages.

Bhatla, et al., "Understanding credit card frauds", Available at: <<http://www.popcenter.org/problems/credit_card_fraud/pdfs/bhatla.pdf>>, Jun. 2003, 17 Pages.

Caldeira, et al., "Characterizing and Preventing Chargebacks in Web Payment Services", In International Journal of Computer Information Systems and Industrial Management Applications, vol. 6, Dec. 2014, pp. 116-125.

Goodale, David, "How to Fight Fraud and Reduce Chargebacks", Available at: <<https://www.merchant-accounts.ca/how_to_fight_fraud_reduce_chargebacks.php>>, Oct. 22, 2012, 18 Pages.

* cited by examiner

900

1000

BULK DISPUTE CHALLENGE SYSTEM

PRIORITY INFORMATION

This application claims priority from U.S. Provisional Patent Application Ser. No. 62/314,986, filed Mar. 29, 2016, the contents of which are incorporated herein by reference in its entirety.

BACKGROUND

A customer may use a credit service to pay for items or services purchased at a store. The items may be a physical item, a digital content item, or a software application. The credit service may represent to the store that the credit service is to cover the cost of the purchase, without the customer having to provide physical cash money. The credit service may aid in telephone or Internet transactions, in which the exchange of physical money is impractical. The customer may then reimburse the credit service for the purchase at a later date.

However, since the customer is not physically present for the transaction, the transaction may be vulnerable to purchase error, either of the malicious or innocent variety. A customer may contact the credit service after the purchase has gone through to rescind the purchase and request a refund, referred to as a chargeback. The store may then be forced to refund the money to the credit service, even if the store has already provided the product or service. The store may dispute a chargeback with the credit service, referred to as a representment.

The larger the store, the more of these chargebacks the store has to deal with on a daily basis. Not disputing the chargebacks may result in major losses to the business. Disputing chargebacks destined to fail may waste company resources.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to selecting disputes to challenge from a bulk set of dispute events based on a probability of success and a return on investment. The bulk dispute challenge system may receive a dispute success model that calculates a predicted probability of success for disputes generated by applying a machine learning model to a training data set featuring multiple attributes describing data characteristics of disputed events. The bulk dispute challenge system may apply the dispute success model to a dispute of a dispute set. The bulk dispute challenge system may calculate a predicted probability of success for a dispute challenge. The bulk dispute challenge system may perform a dispute decision for the dispute based in part on the predicted probability of success and a dispute return on investment. The bulk dispute challenge system may execute the dispute challenge to the dispute based on the dispute decision.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Figure 1:
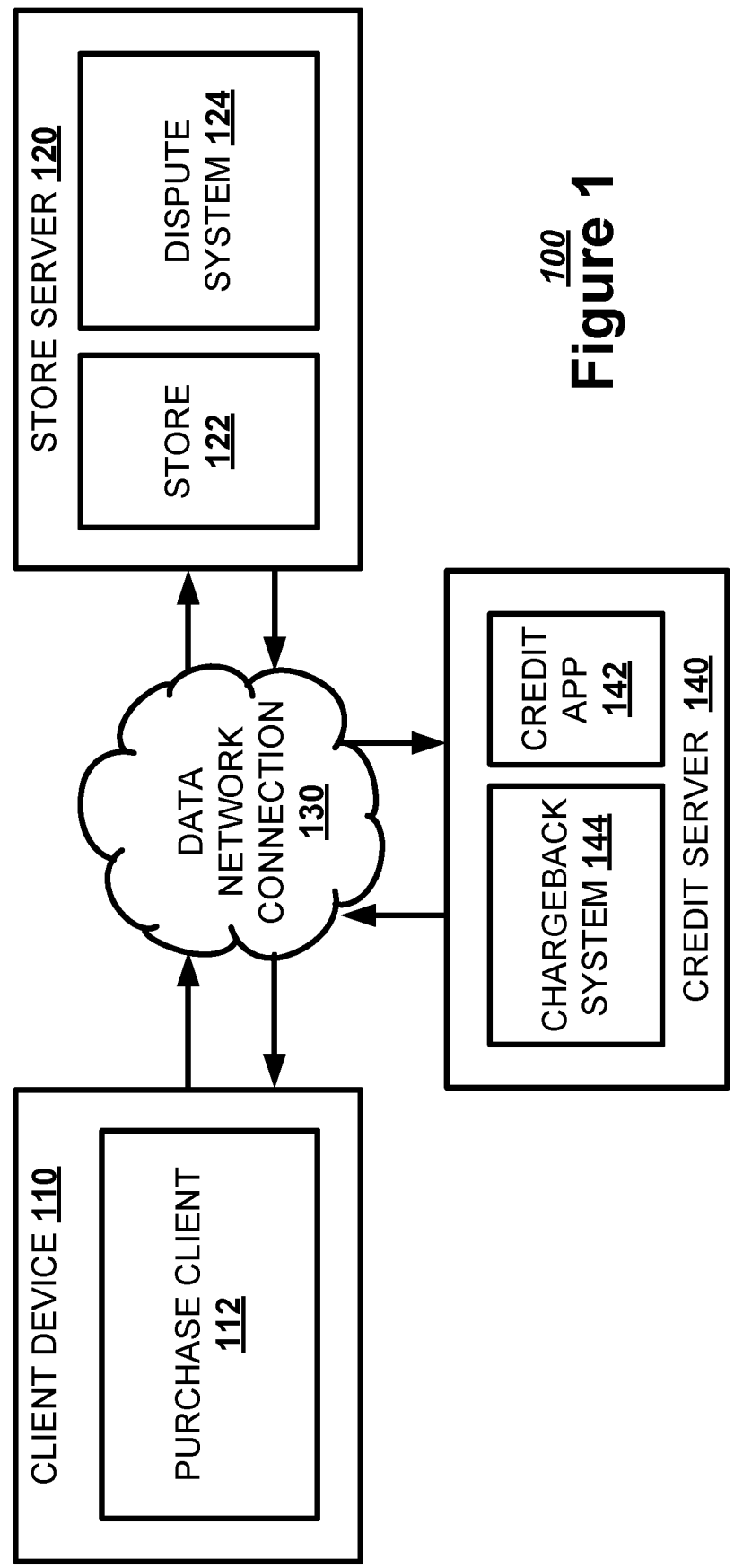
FIG. 1 illustrates, in a block diagram, one example of a data network.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a bulk dispute challenge system, a computing device, or a machine-implemented method.

In one example, a bulk dispute challenge system may select disputes to challenge from a bulk set of dispute events based on a probability of success and a return on investment. The bulk dispute challenge system may receive a dispute success model that calculates a predicted probability of success for disputes generated by applying a machine learning model to a training data set featuring multiple attributes describing data characteristics of disputed events. The bulk dispute challenge system may apply the dispute success model to a dispute of a dispute set. The bulk dispute challenge system may calculate a predicted probability of success for a dispute challenge. The bulk dispute challenge system may perform a dispute decision for the dispute based in part on the predicted probability of success and a dispute return on investment. The bulk dispute challenge system may execute the dispute challenge to the dispute based on the dispute decision.

Bulk dispute challenging may be a complicated process with an unclear mechanism for determining a positive or negative decision. Even with the complete consideration of any compelling evidence and any other possible factors affecting the win rate, a bulk dispute decision mechanism may not improve the intrinsic win rate, either by count or by value returned, for randomly selected disputed events. However, under certain constraints, such as the disputing capacity or the disputing cost, a bulk dispute selection system may select a subset of decisions to dispute so that a metric may be maximized, such as a net gain in value returned rather than the win rate. Although the maximal win rate may be correlated with maximization of a metric, these features may not be identical.

For example, a chargeback is a business event usually initiated by a customer asking for the refund of a purchase made on a credit card of the customer, possibly due to fraud or other reasons, by contacting the issuing bank of the card. The issuing bank may then contact the acquiring bank of the merchant. If the acquiring bank believes the chargeback is disputable, the acquiring bank may pass along the chargeback to the merchant. If the merchant feels the benefits associated with disputing the chargeback surpasses the expenses, the merchant may seek a chargeback reversal. The process of disputing the chargeback with the issuing bank is called a chargeback representment. Many online merchants may receive a large number of chargebacks every day. Usually the merchant may have a very limited time frame to respond to and dispute a chargeback, such as seven days. To dispute a chargeback, the merchant may provide sufficient compelling evidence by preparing a formal rebuttal letter to the issuing bank to disapprove the claim of the cardholder. Filing such a letter may be difficult and time consuming. When the merchant has limited resources of time and money, the merchant may select a subset of chargebacks to dispute to win back as many dollars as possible. In usual practice, people may select a subset of chargebacks for representment based on certain single factors such as a bank identification number (BIN), a reason code, a dollar amount, or other factors. This empirical selection process may not guarantee the maximization of the dollar won under certain disputing capacity constraints.

In the example of representment, a machine learning based approach may find an optimal subset of chargebacks to dispute so as to maximize the net gain in a systematic way. A bulk dispute challenge system may build a predictive model by learning from the historical data and predicting the chance of winning for any new chargebacks. The bulk dispute challenge system may apply an optimization process to the new chargeback candidates to select a subset of them with the net gain being maximized. The bulk dispute challenge system may forgo improving the win rate, by count or dollar, by providing more compelling evidence or stronger evidence. Instead the bulk dispute challenge system may aim to achieve maximal net gain of dollar, or equivalently the maximal return of investment (ROI) under certain disputing capacities and cost constraints. On the other hand, the bulk dispute challenge system may customize the model to optimize other metrics such as the win rate, either by count or by dollar, and incorporate other business constraints such as restricting of disputing certain type of chargebacks.

By applying machine learning, a bulk dispute challenge system may make these determinations, such as chargeback representment, systematically. Previously, a person may select chargeback to dispute based on individual factors such as a reason code, dollar amount, other factors, or the simple combination, using rule based methodology. Such practice may be based on empirical evidence or some simple analysis of historical data instead of systematical treatment under the frame work of machine learning and big data. The performance of such approach may be not optimal and not stable.

A database system may store the chargeback data, including the previously mentioned attributes. The database system may obtain this chargeback information from a variety of sources, such as from the acquiring bank of the merchant, other information systems of the merchant such as the risk system and the payment gateway, or the issuing bank. The database system may record the binary dispute results for the chargebacks that have been disputed. The database system may wait enough time for a dispute result to mature. Due to the nature of business, different merchants may have different time periods of maturity. The database system may estimate a mature time period from the historical data. The database may use a second chargeback as evidence for determining if a chargeback is mature or not. If the customer files the second chargeback, a current strategy is to not dispute the chargeback and lose automatically. So in this case, the "lost" result may be final and the chargeback dispute fully mature. The database system may not wait until the chargeback dispute has become one hundred percent mature since maturity may take too long time, resulting in the dispute dates of the training data being too old compared to the testing data. This strategy may make the prediction results less accurate. Empirically, the database system may choose the chargebacks that have reached 85%-90% maturity.

A model generation module may train the machine learning model using the binary dispute results of "won" or "lost" with a set of features describing each disputed event. For example, in a chargeback, these descriptive features may include a bank identification number (BIN) of the issuing bank, the name of the bank, the country of the bank, a reason code describing the motivation behind the transaction dispute, the payment instrument type, the country of transaction, a flag identifying the transaction as foreign or domestic, the currency of the transaction, a flag identifying the transaction as business or consumer, the chargeback dollar amount, the type of business for the transaction, a flag identifying a fraud alert from the issuing bank that may have triggered the chargeback, a source for the fraud alert, a fraud alert reason code identifying the reason for the fraud alert, a flag identifying whether the chargeback has been refunded, the chargeback type, the days between the transaction and the chargeback, the days between the transaction and the inquiry date, the days between the transaction and the fraud alert, and other features. The chargeback dollar amount may be a continuous variable or discrete buckets. The fraud alert reason code may describe the associated card as "Lost", "Stolen", "Never Received", "Counterfeit", or other fraud reasons. The chargeback type may be "Malicious Fraud", "Family Fraud", or other types determined by the merchant processing the chargeback.

Once the model generation module has acquired a viable amount of mature historical data, the model generation module may start to build the machine learning model. First, the model generation module may perform training, by examining the historical data to find out the correlation of the attributes with the known dispute results, or "ground truth", so as to establish the functional mapping, or "model", between the attribute space and the binary dispute result space. The functional mapping may be linear or non-linear. There are several steps in the training stage:

For example, the model generation module may choose the training data set from historical data with dispute dates from between the $180^{th}$ day to the $120^{th}$ day before a live application. The model generation module performs a live application by applying the model to a current new set of disputes. The model generation module may choose the validation data set from historical data with dispute dates from between the 121st day to $126^{th}$ day before the live application.

The choice of training date range and validation date range may be flexible according to the actual business use case. Alternatively, the bulk data system may use K-fold cross validation instead of using disjoined training set and validation set. The model generation module may use the validation process to monitor the performance of the trained model. The model generation module may select a subset of disputes to challenge from a testing data set. The testing data may have the same set of attributes as training data and validation date without the dispute results.

The model generation module may then do some data cleaning and transforming. In practice, for each chargeback, the model generation module may not have every attribute available. For example, if a chargeback has no fraud alert, the attribute value may be empty. The model generation module may preprocess the data by replacing each empty value with a special string "Unknown". The model generation module may also get rid of any outliers for the numeric variables to avoid any clutter to the training. For categorical variables, such as payment instrument and bank identification number, the model generation module may convert a categorical variable into a continuous numerical variable by applying a weight-of-evidence (WOE) transform. For each level x in a categorical variable with a binary response, the weight-of-evidence transform may be defined as:

$$WOE(x) = \ln\left(\frac{p(x|1)}{p(x|0)}\right)$$

where p(x|1) is the relative frequency for the case "won", represented by "1", and p(x|0) is the relative frequency for the case "lost", represented by "0". The model generation module may save a weight-of-evidence transform obtained from the training data for later application to the validation data set, as well as the testing data set. The model generation module may use any numerical attribute not transformed together with the weight-of-evidence transformed variables as a predictor.

Since not every feature has the same discriminatory power, the model generation module may select just a subset of features for enhancing the generalization of the model and shortening the training time. By calculating the information value (IV), as defined by:

$$IV = \sum\left[(p(x|1) - p(x|0))\ln\left(\frac{p(x|1)}{p(x|0)}\right)\right],$$

the model generation module may rank the features to select the top performers. An empirical rule of thumb may show that if the information value falls within a range of [0, 0.02], then the feature in question may not be predictive. If the information value falls within a range of (0.02, 0.1], then the feature may have weak predictive power. If the information value falls within a range of (0.1, 0.3], then the feature may have moderate predictive power. If the information value falls within a range of (0.3, ∞), then the feature may have a strong predictive power. Alternatively, the model generation module may use many other classical methods to select features, such as correlation or a similarity based approach.

The model generation module may use many of the contemporary predictive machine learning models or classifiers that accept numerical predictors and binary response. The model may calculate the score, in a range from 0 to 1, to describe the probability of a class label.

The model generation module may weigh many factors, such as accuracy, computational cost in time or memory usage, robustness and stability, or other factors. The model generation module may select a classifier, such as Random Forest or Gradient Boosting Machine (GBM), to the type of transaction used or the outcome desired. For example, a model generation module may use a computationally heavy algorithm with hard-to-tune parameters to gain a slight improvement of accuracy.

To guide the selection of model, the model generation module may use a receiver operating characteristics (ROC) curve. A receiver operating characteristics curve is a graphical plot that illustrates the performance of a binary classifier system as a discrimination threshold is varied. The model generation module generates the receiver operating characteristics curve by plotting the true positive rate (TPR) against the false positive rate (FPR) at various threshold settings. The true positive rate, or the sensitivity or recall in machine learning, measures the number of correctly identified positives. The false positive rate, or fall-out, refers to the probability of falsely rejecting that two features are unrelated. The false positive rate may be calculated as 1—the true negative rate, or specificity. The receiver operating characteristics curve may thus be defined as the sensitivity as a function of fall-out. When using normalized units, the area under the receiver operating characteristics curve, which is called the area under the curve (AUC), may be equal to the probability that a classifier will rank a randomly chosen positive instance higher than a randomly chosen negative one. A larger area under the curve may indicate a better classifier. For example, when the area under the curve is in range of [0.6, 0.7], the model generation module may deem the classifier to be fair. When the area under the curve is in range of [0.7, 0.8], the model generation module may deem the classifier to be good. When the area under the curve is in range of [0.9, 1], the model generation module may deem the classifier to be excellent. Besides the area under the curve, the true positive rate, and the false positive rate, the model generation module may examine other related statistical metrics, such as precision and specificity, as well as several domain-specific metrics, such as win rate by cent, win rate by dollar, average net gain per dispute, and other metrics.

In the model development phase, the model generation module may execute training and validation as an iterative process. The model generation module may apply machine learning to the training data to obtain a trained model. The model generation module may apply the trained model to the validation data to obtain the prediction results. The model generation module may compare the prediction results with the ground truth to determine the performance of the trained model. The model generation module may choose validation data from the date range without overlap with the training data range, or the model generation module may use a cross validation technique by splitting the training data set. By looking at performance metrics such as the area under the curve, validation helps to optimize the prediction accuracy for new disputes. The model generation module may execute the training and validation for each run of the optimal dispute subset selection. The model generation module may set the training and validation date range as close as possible to the new dispute date while still having the requisite maturity.

Once the model generation module completes the training and validation phase, a dispute decision module may apply the trained model to a pool of new disputes to select an optimal subset for challenging. The dispute decision module may apply the trained model to each candidate dispute and calculate a score representing the probability of a win for that dispute challenge.

The dispute decision module may select a subset of disputes for challenging, such as chargeback subsets for representment. Representment usually provides a limited response time for an overwhelming number of chargebacks. For example, the number of chargebacks to be dispute every week may exceed 20,000. To represent each chargeback in a limited time frame may consume a large amount of resources, such as a processing fee, a cost of labor, or other resources. Even if a bulk dispute challenge system has the resources to dispute each chargeback, the cost of representment may surpass the dollar amount recovered. Further, the win rate by number may have an upper limit, rendering disputing each chargeback unnecessary. Disputing unnecessary chargebacks may bring extra cost.

For limited resources, the dispute decision module may represent a cost constraint as a budget in dollar amount or a dispute capacity limiting the number of disputes to challenge. The dispute decision module may convert the budget dollar amount to the upper bound of disputes to challenge. For example, if the budget is $10,000, and the cost per challenge is in flat rate of $2, then the upper bound N may be 5,000. Alternately, the cost rate for the disputes may be any non-linear function of the dispute number, dispute types, and other factors. To maximize the net gain, the dispute decision module may determine the expected net gain in value, such as in dollar amount, by multiplying the score of each dispute with the transaction gain in value with the cost subtracted. The dispute decision module may then sort the expected net gain values in descending order, identifying the first N disputes as the subset for challenge.

The dispute decision module may optimize the process without considering the resource limit. The dispute decision module may draw the cumulative net gain curve to increase the upper bound N to the point that the net gain value becomes saturated. The dispute decision module may then select the top upper bound of disputes for challenge.

The dispute decision module may use an alternate model to further optimize the net gain. In this model, the dispute decision module may divide the dispute candidates into buckets according to the value of the dispute, such as in dollars. For example, the dispute decision module may divide the dollar amount into 5 buckets: (0,25), (50, 50), (50,100), (100, 200), (200, 500), (500, ∞]. For each bucket, the dispute decision module may sort the disputes by winning scores in descending order. For each bucket, the dispute decision module may set a score threshold $t_i$ so any disputes with a score higher than the threshold is disputed. To maximize the net gain, the model generation module may identify an optimal threshold $t_i$.

In the training and validation phase, the model generation module may estimate the value-weighted receiver operating characteristics curve for each bucket, which may vary between buckets. For the same threshold value, the true positive rate and the false positive rate may be different for different buckets. The model generation module may estimate the prior positive rate (PPR), representing the prior win rate by a value amount, such as dollar, for each bucket based on historical data. Then the model generation module may utilize this inconsistency of performance among different buckets to further optimize the total net gain. For each bucket, the net gain may be the sum of dollar amount of every dispute in that bucket, multiplied by the prior positive rate corresponding to that bucket, multiplied by the true positive rate corresponding to the threshold $t_i$, and subtracting the cost for each dispute with scores higher than the threshold. The final objective function may then be the sum of the net gains in each bucket. The model generation module may thus find an optimal set of threshold $t_i$ for each bucket, with the dispute number N as the upper bound, so as to maximize the total net gain. The model generation module may estimate the initial threshold values from the results obtained by the expected net gain ranking. The model may naturally incorporate different constraint conditions into the optimization. For example, if the dispute cost is a complicated chargeback-dependent function, the model generation module may incorporate the function into the optimization. The model generation module may factor the customer impact of disputing certain types of chargeback as a cost of impact into the model.

A simple version of the model to maximize the net gain may be expressed as:

Net Gain=Total Amount Won−Total Cost

The more complex version of the model may be expressed as:

$$\underset{t_i}{\operatorname{argmax}}\left\{\sum_i \left[TPR(t_i) \cdot PPR(i) \cdot \sum_{k_i} d(k_i)\right] - \sum_{k_i, s_{k_i} > t_i} g(k_i)\right\}$$

with i representing an index of the buckets; $t_i$ representing a score threshold for bucket i; $k_i$ representing an index of k-th dispute in bucket i; $TPR(t_i)$ representing the true positive rate, such as by dollar, as a function of $t_i$; $PPR(t_i)$ representing the prior positive rate by dollar, as a function of $t_i$; $d(k)$ representing the dollar amount of k-th dispute in bucket I; $g(k_i)$ representing the cost of k-th dispute in bucket i; and $s_{k_i}$ representing the score of the k-th dispute in bucket i. The choice of features for sorting into buckets may be flexible and not just limited to dollar amount alone, and may include other features.

For example, instead of using a dollar amount bucket, a model generation module may use buckets that combine the dollar amount with the dispute type. For example, the model generation module may use a bucket based on "[0, 50] with FamilyFraud" and a bucket based on "[100, 200] with Malicious Fraud". However, increasing the complexity of the buckets by using multiple features instead of a single feature may increase the difficulty of reliably estimating the true positive rate and the prior positive rate by decreasing the number of samples.

In addition to prioritizing the net gain, the model generation module may also formulate the optimization problem for prioritizing other quantities, such as the overall win rate by count or by dollar, a return of investment describing the net gain dollar for each dollar spent, or other quantities. For example, calculating the net gain of winning back a chargeback dispute may become complicated when the dispute decision module considers the customer impact due to disputing certain type of chargeback such as "Family Fraud" and "Malicious Fraud". Disputing the charges may lead to customer dissatisfaction, resulting in customer churn and reducing long term revenue. Thus, the dispute decision module may incorporate quantitative cost of impact into the chargeback selection process, if known. For example, the dispute decision module may limit the number or percentage of certain type of chargebacks available for dispute. Alternately, the model generation module may incorporate the per-chargeback cost calculation into the model.

After the model has been used for a set period of time, the model generation module may obtain the most recent historical disputes with ground truth from the disputes challenged in previous testing phases. The model generation module may use the most recent historical disputes with ground truth as training data for the next phase of model building. In such a situation, the model generation module may obtain the training data from the model-selected disputes, instead of randomly selected samples from all disputes. Eventually, this selection bias may cause model degradation as the statistics of the dispute challenges, such as chargeback representment, may change over time. The data from those model-selected disputes may no longer present the statistics of the dispute challenging process, which otherwise may be caught by using the randomly selected disputes. For example, some of the chargebacks not selected by the model, and thus undisputed, may become more possible to win. Conversely, some of the disputed chargebacks may become less possible to win. If a chargeback is undisputed, the chargeback may have no associated ground truth.

To solve this, the dispute decision module may generate a control group that is automatically challenged. For a set period after the model has been used, the dispute decision module may produce a group of randomly selected candidate disputes to be challenged without going through model-based selection. The randomly selected disputes may be referred to as a control group while the model-selected disputes may be referred to as a treatment group. The model generation group may compare the dispute results between the control group and the treatment group to monitor the model degradation issue. If the model generation module observes that the model has a serious degradation, the dispute decision module may increase the size of the control group to allow more randomly selected disputes to be challenged, producing less biased samples for training.

In the example of chargebacks, a client device may use a data network to purchase a digital item. FIG. 1 illustrates, in a block diagram, one example of a data network 100. A user may use a client device 110 to implement a purchasing client 112 to access a store server 120 executing an online store 122 via a data network connection 130. The client device 110 may be a personal computer, a laptop, a tablet, a mobile phone, a game console, a smart watch, or other computing device that may connect with another computing device. The store server 120 may be implemented on a single server or a distributed set of servers, such as a server farm. The data network connection 130 may be an internet connection, a wide area network connection, a local area network connection, or other type of data network connection.

The user may pay for the purchase using a credit service. The credit service may have a credit server 140 executing a credit software application 142. The store server 140 may be implemented on a single server or a distributed set of servers, such as a server farm. The credit software application 142 may transfer money to pay for the purchase to a store account. The credit software application 142 may then charge the user for the purchase at a later date.

The user may dispute the amount charged by the online store 122. The credit server 140 may execute a chargeback system 144 to rescind payment to the online store 122. In the case of a large online store 122 that deals with a high volume of purchases, and thus a high volume of chargebacks, the store server may have an automated bulk dispute challenge system 124 to automatically dispute a chargeback. The bulk dispute challenge system 124 may select a chargeback to dispute based on a predicted probability of success and the amount received upon success of the chargeback. Thus, the bulk dispute challenge system 124 may selectively dispute chargebacks to maximize rate of return.

Figure 2:
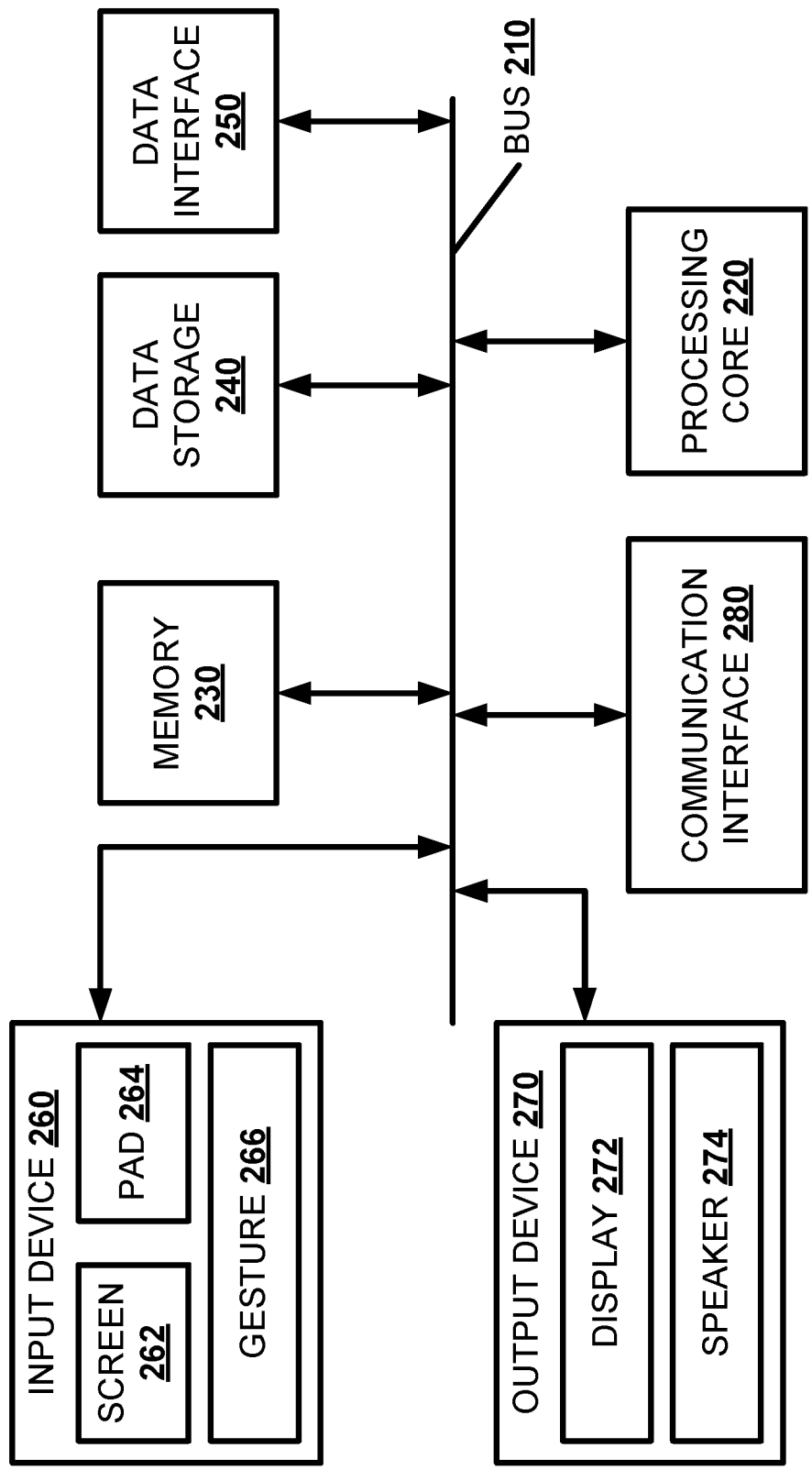
FIG. 2 illustrates, in a block diagram, one example of a computing device.

FIG. 2 illustrates a block diagram of an exemplary computing device 200 which may act as a bulk dispute challenge system. The computing device 200 may combine one or more of hardware, software, firmware, and system-on-a-chip technology to implement a bulk dispute challenge system. The computing device 200 may include a bus 210, a processing core 220, a memory 230, a data storage 240, a data interface 250, an input device 260, an output device 270, and a communication interface 280. The bus 210, or other component interconnection, may permit communication among the components of the computing device 200.

The processing core 220 may include at least one conventional processor or microprocessor that interprets and executes a set of instructions. The processing core 220 may be configured to execute a model generation module configured to apply a machine learning model to a training data set to generate a dispute success model that calculates a predicted probability of success for disputes based on multiple attributes. The processing core 220 may be further configured to execute a dispute decision module configured to perform a dispute decision for a dispute based in part on a predicted probability of success and a dispute return on investment. The processing core 220 may be also configured to execute a tracking module to compare an accuracy rate for a dispute success model to an alternate accuracy rate for an alternate dispute success model.

The memory 230 may be a random access memory (RAM) or another type of dynamic data storage that stores information and a series of instructions for execution by the processor 220 to generate a dispute success model. The memory 230 may also store temporary variables or other intermediate information used during execution of instructions by the processor 220. The memory 230 may be configured to track an accuracy rate for a dispute success model by comparing a predicted probability of success to an actual success rate.

The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a data interface 250 for accessing a database for storing a historical dispute data set, such as a historical chargeback data set describing disputed credit transactions. The data interface 250 may be configured to receive a training data set featuring multiple attributes describing data characteristics selected from a historical dispute data set describing disputed events.

The input device 260 may include one or more conventional mechanisms that permit a user to input information to the computing device 200, such as a keyboard, a mouse, a voice recognition device, a microphone, a headset, a touch screen 262, a touch pad 264, a gesture recognition device 266, etc. The output device 270 may include one or more conventional mechanisms that output information to the user, including a display screen 272, a printer, one or more speakers 274, a headset, a vibrator, or a medium, such as a memory, or a magnetic or optical disk and a corresponding disk drive.

The communication interface 280 may include any transceiver-like mechanism that enables computing device 200 to communicate with other devices or networks. The communication interface 280 may include a network interface or a transceiver interface. The communication interface 280 may be a wireless, wired, or optical interface. The communication interface may be configured to send to a dispute moderating party a dispute challenge to a dispute based on a dispute decision.

The computing device 200 may perform such functions in response to processing core 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 280.

Figure 3:
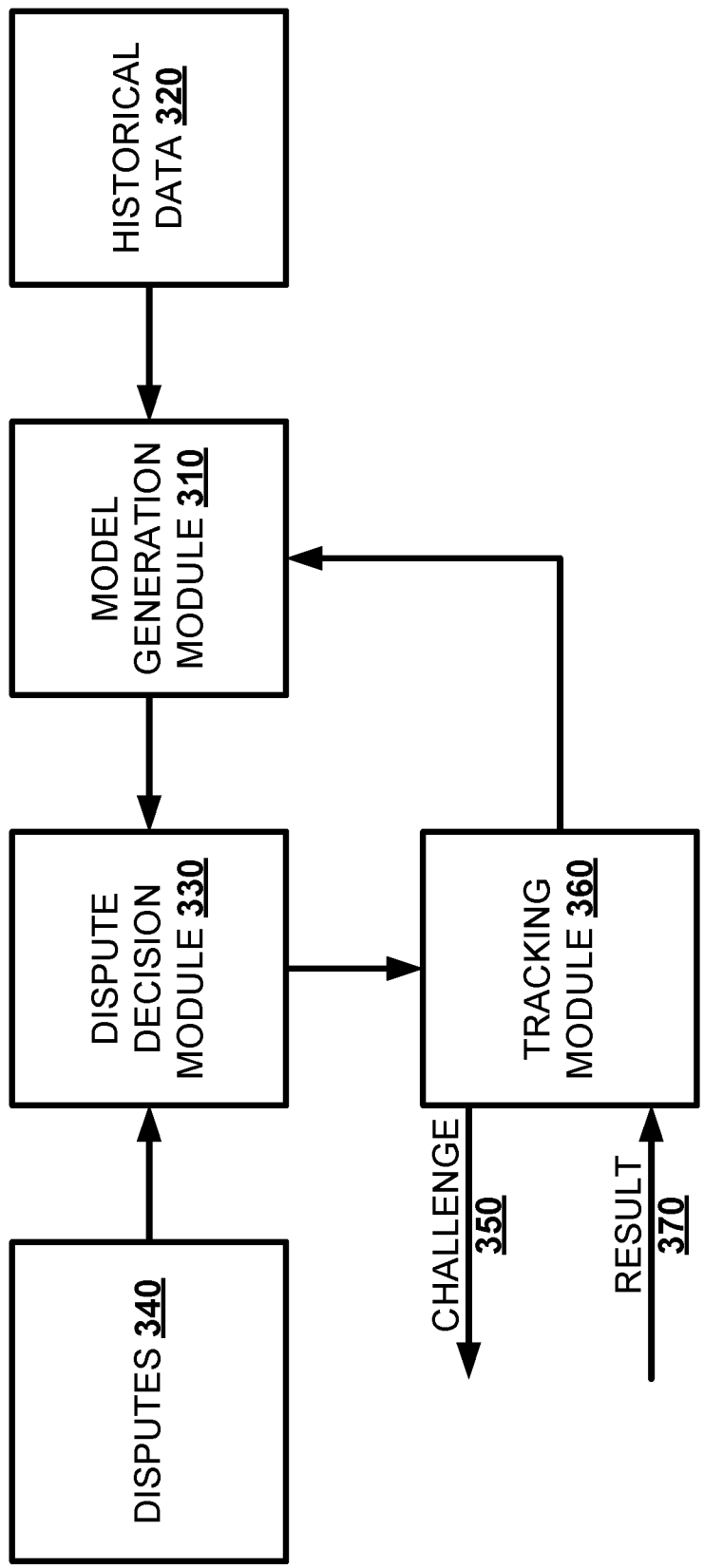
FIG. 3 illustrates, in a block diagram, one example of a software architecture for a bulk dispute challenge system.

FIG. 3 illustrates, in a block diagram, one example of a software architecture 300 for a bulk dispute challenge system. A model generation module 310 may be configured to select a training data set featuring multiple attributes describing data characteristics selected from a historical dispute data set 320 describing disputed events, such as a historical chargeback data set describing disputes to chargebacks rescinding purchases. The model generation module 310 may be configured to apply a machine learning model to the training data set to generate a dispute success model that calculates a predicted probability of success for disputes based on the multiple attributes. The model generation module 310 may be further configured to update the dispute success model based on an accuracy rate. The model generation module 310 may be also configured to create an alternate dispute success model by applying an alternate primary machine learning model to the training data set. The model generation module 310 may be additionally configured to update the dispute success model based on a control dispute result.

The model generation module 310 may be configured to determine an impact factor for an attribute of the multiple attributes describing an impact of the attribute on a resulting determination. The model generation module 310 may be further configured to prune an attribute of the multiple attributes from consideration in the dispute success model based on a low impact factor. The model generation module 310 may be also configured to add a previously pruned attribute of the multiple attributes back into consideration for the dispute success model to determine whether an impact factor for the pruned attribute has changed. The model generation module 310 may be additionally configured to factor a customized attribute describing a client-specific feature of the multiple attributes in the dispute success model.

The model generation module 310 may provide the dispute success model and an alternate dispute success model to a dispute decision module 330. The dispute decision module 330 may be configured to receive a bulk set of disputes 340, such as a bulk set of chargebacks from a credit service. The dispute decision module 330 may be further configured to apply the dispute success model to a dispute of the dispute set to calculate a predicted probability of success for a dispute challenge. The dispute decision module 330 may be also configured to perform a dispute decision for the dispute based in part on the predicted probability of success and a dispute return on investment.

The dispute decision module 330 may be configured to factor a bandwidth consumption into the dispute decision. The dispute decision module 330 may be further configured to apply a challenge threshold to the predicted probability of success combined with the dispute return on investment to determine the dispute decision. The dispute decision module 330 may be also configured to adjust a challenge threshold for the predicted probability of success based on a bandwidth estimate. The dispute decision module 330 may be additionally configured to forgo a dispute challenge based on an administrative constraint. The dispute decision module 330 may be further configured to partition the dispute set into a control group and a treatment group.

The dispute decision module 330 may decide to send a dispute challenge set 350 contesting the dispute set to the dispute moderating party, such as a credit service for chargeback representment. The dispute decision module 330 may alert a tracking module 360 that the dispute challenge set 350 was sent. The tracking module 360 may receive a dispute result set 370 from the dispute moderating party. The tracking module 360 may track an accuracy rate for the dispute success model used by the dispute decision module 330 by comparing the predicted probability of success to an actual rate of success. The tracking module 360 may track an alternate accuracy rate for the alternate dispute success model used by the dispute decision module 330 by comparing the alternate predicted probability of success to an alternate actual rate of success. The tracking module 360 may compare the accuracy rate for the dispute success model to the alternate accuracy rate for the alternate dispute success model.

Figure 4:
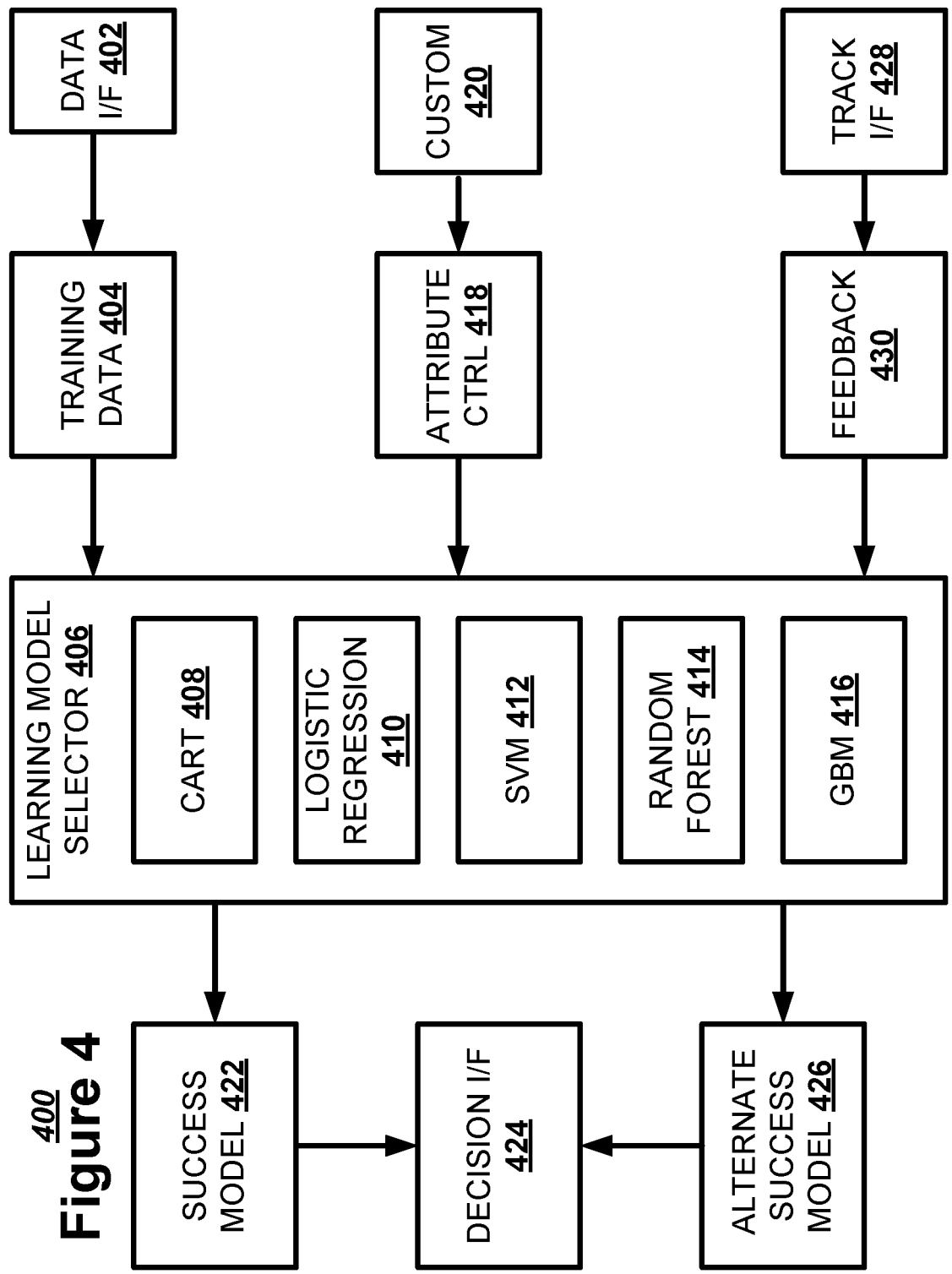
FIG. 4 illustrates, in a block diagram, one example of a model generation module.

FIG. 4 illustrates, in a block diagram, one example of a model generation module 400. The model generation module 400 may have a data interface (I/F) 402 to receive a training data set 404 featuring multiple attributes describing data characteristics selected from a historical dispute data set describing disputed events. The model generation module 400 may forward the training data set 404 to a learning model selector 406 to apply a machine learning model.

The learning model selector 406 may select a Classification and Regression Tree (CART) model 408, a logistic regression model 410, a support vector machines (SVM) model 412, a random forest model 414, or a gradient boosted machine model 416. A Classification and Regression Tree model 408 uses a tree-like graph of decisions of possible outcomes. A logistic regression model 410 uses a categorical dependent variable taking a fixed number of possible values. A support vector machines model 412 maps a set of training examples as a points in space divided by a clear gap. A random forest model 414 constructs multiple decision trees at training time and outputs the class that is the mode of the classification or mean prediction of the individual trees. A gradient boosted machine model 416 builds a model in a staged fashion and allows an arbitrary differentiable loss function.

An attribute control 418 may manage attributes describing data characteristics of the training data set 404. For example, the attribute control 418 may factor in a customized attribute 420 describing a client-specific feature. The model generation module 400 may use the selected machine learning model to generate a dispute success model 422 to send over the decision interface 424 to the dispute decision module. Additionally, the model generation module 400 may use an alternate machine learning model to generate an alternate dispute success model 426 to send over the decision interface 424 to the dispute decision module. The model generation module 400 may receive via a tracking interface 428 a feedback result that a machine learning model may use to update a dispute success model 422.

Figure 5:
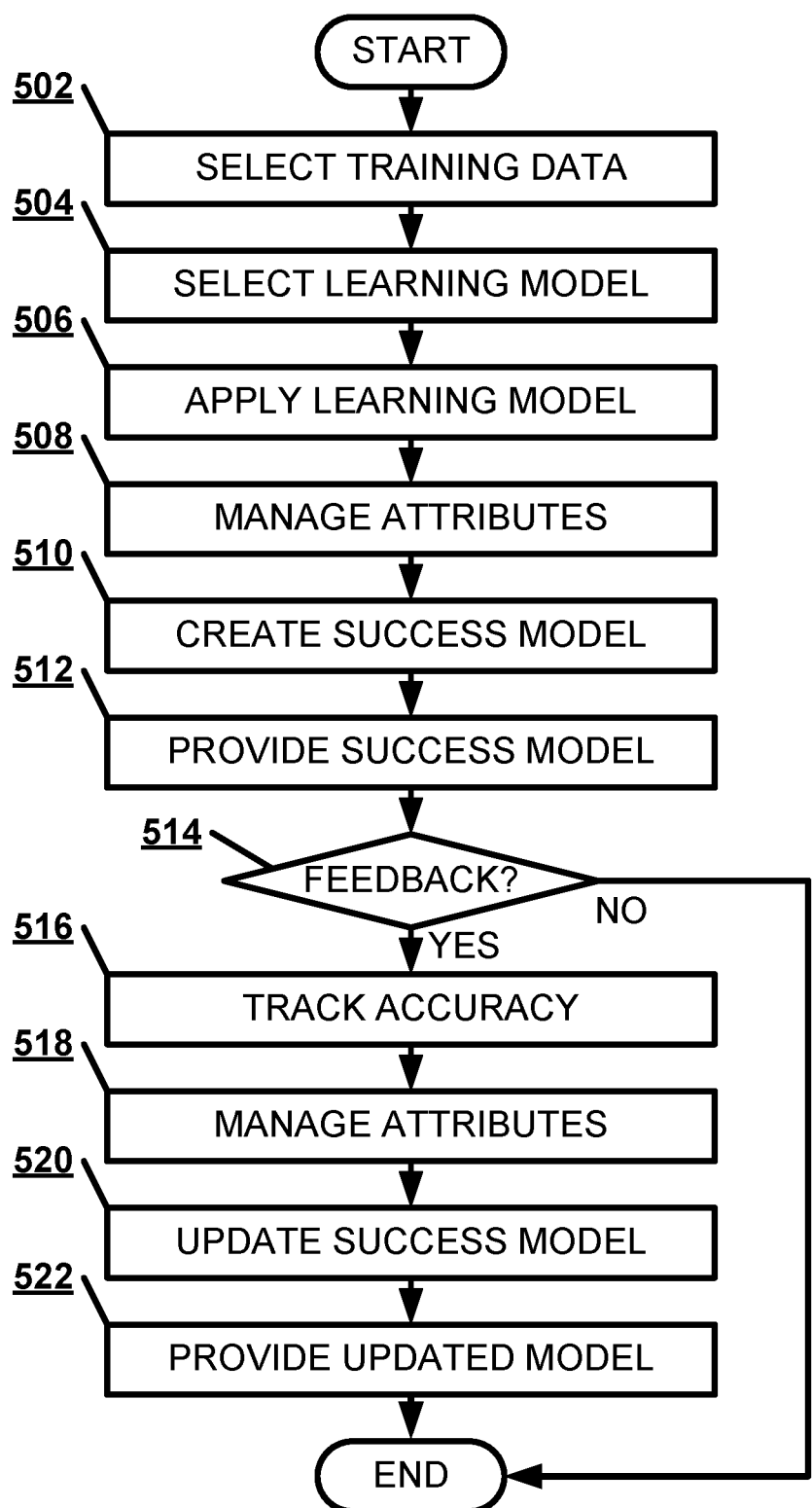
FIG. 5 illustrates, in a flowchart, one example of a method of generating a dispute success model.

FIG. 5 illustrates, in a flowchart, one example of a method 500 of generating a dispute success model. A model generation module may select a training data set featuring multiple attributes describing data characteristics from a historical dispute data set describing disputed events (Block 502). The model generation module may select the machine learning model from a machine learning model set (Block 504). The model generation module may apply a machine learning model to the training data set to generate a dispute success model (Block 506). The model generation module may manage the multiple attributes featured with the training data set (Block 508). The model generation module may create a dispute success model that calculates a predicted probability of success for dispute challenges based on the multiple attributes (Block 510). The model generation module may provide the dispute success model to a dispute decision module to use in determining whether to challenge a dispute based on the predicted probability of success (Block 512). If the model generation module receives a feedback result from a tracking module (Block 514), the model generation module may track an accuracy rate for the dispute success model by comparing the predicted probability of success to an actual success rate (Block 516). The model generation module may manage the multiple attributes featured with the training data set (Block 518). The model generation module may update the dispute success model based on the accuracy rate (Block 520). The model generation module may provide the updated dispute success model to the dispute decision module to use in determining whether to challenge a dispute based on the predicted probability of success (Block 522).

Figure 6:
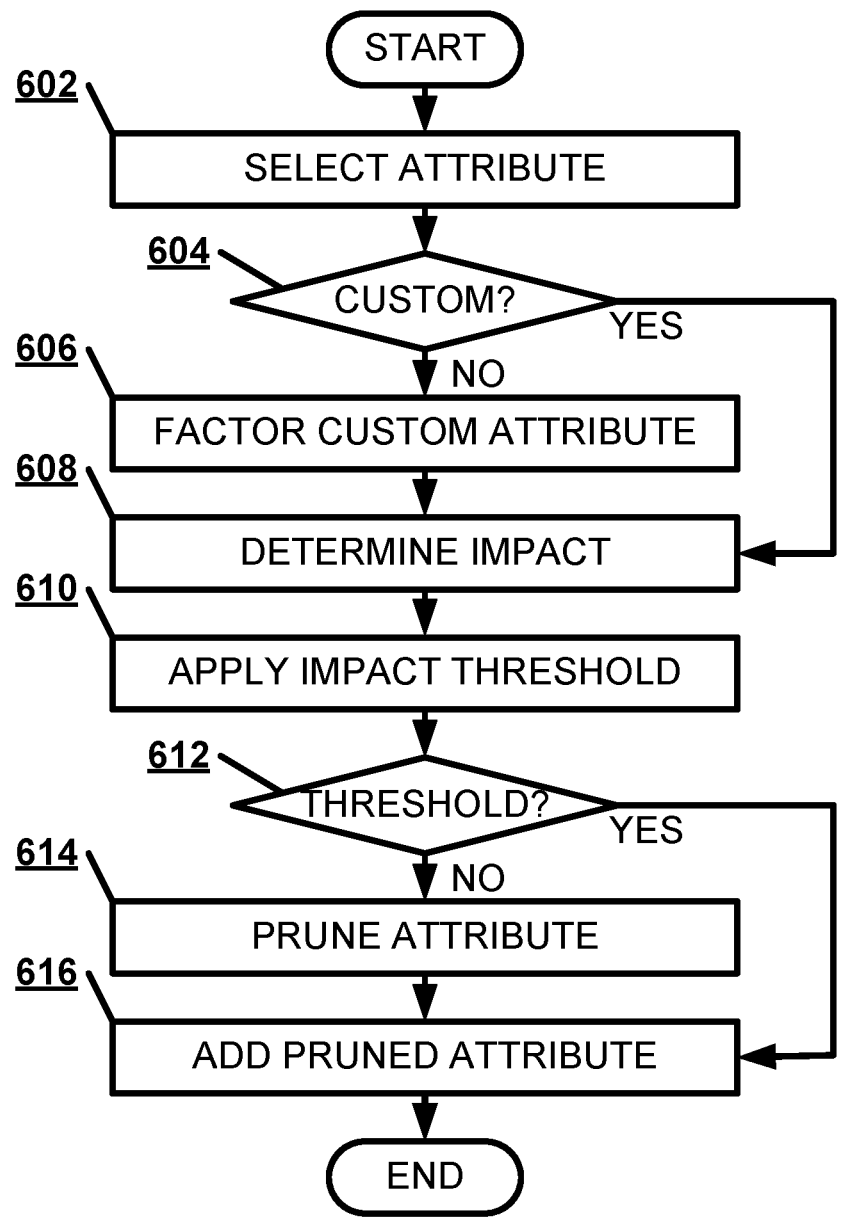
FIG. 6 illustrates, in a flowchart, one example of a method of managing attributes for a dispute success model.

FIG. 6 illustrates, in a flowchart, one example of a method 600 of managing attributes for a dispute success model. The model generation module may select an attribute for management (Block 602). If a custom attribute is present (Block 604), the model generation module may factor a customized attribute describing a client-specific feature of the multiple attributes in the dispute success model (Block 606). The model generation module may determine an impact factor for an attribute of the multiple attributes describing an impact of the attribute on a resulting determination (Block 608). The model generation module may apply an impact threshold in comparison to an impact factor for the attribute of the multiple attributes (Block 610). If the impact factor does not reach the impact threshold (Block 612), the model generation module may prune an attribute of the multiple attributes from consideration in the dispute success model based on a low impact factor (Block 614). The model generation module may add a previously pruned attribute of the multiple attributes back into consideration for the dispute success model to determine whether an impact factor for the pruned attribute has changed (Block 616).

Figure 7:
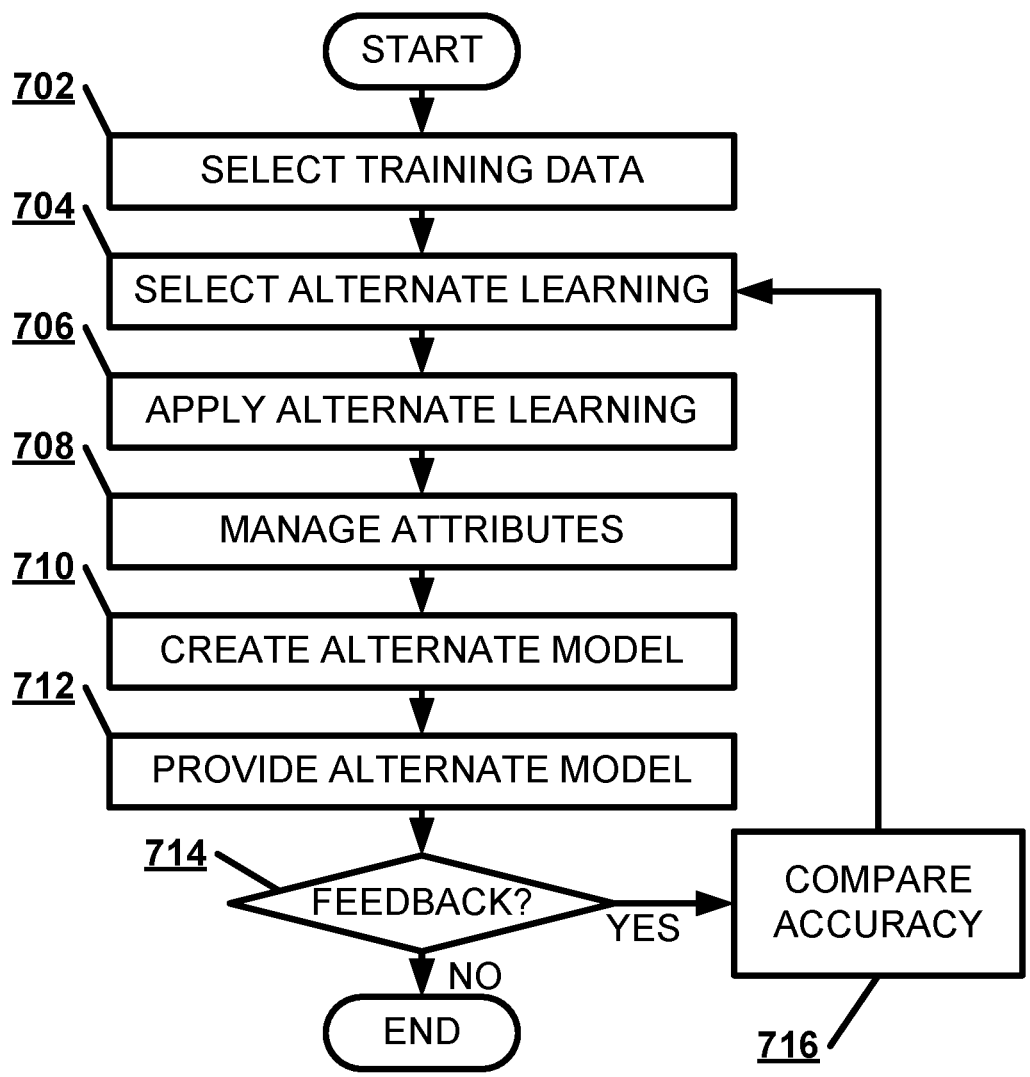
FIG. 7 illustrates, in a flowchart, one example of a method of generating an alternate dispute success model.

FIG. 7 illustrates, in a flowchart, one example of a method 700 of generating an alternate dispute success model. A model generation module may select a training data set featuring multiple attributes describing data characteristics from a historical dispute data set describing disputed events (Block 702). The model generation module may select an alternate machine learning model from a machine learning model set (Block 704). The model generation module may apply the alternate machine learning model to the training data set to generate a dispute success model (Block 706). The model generation module may manage the multiple attributes featured with the training data set (Block 708). The model generation module may create an alternate dispute success model that calculates a predicted probability of success for disputes based on the multiple attributes (Block 710). The model generation module may provide the alternate dispute success model to a dispute decision module to use in determining whether to challenge a dispute based on the predicted probability of success (Block 712). If the model generation module receives a feedback result from a tracking module (Block 714), the model generation module may compare an accuracy rate for a dispute success model to an alternate accuracy rate for an alternate dispute success model (Block 716).

Figure 8:
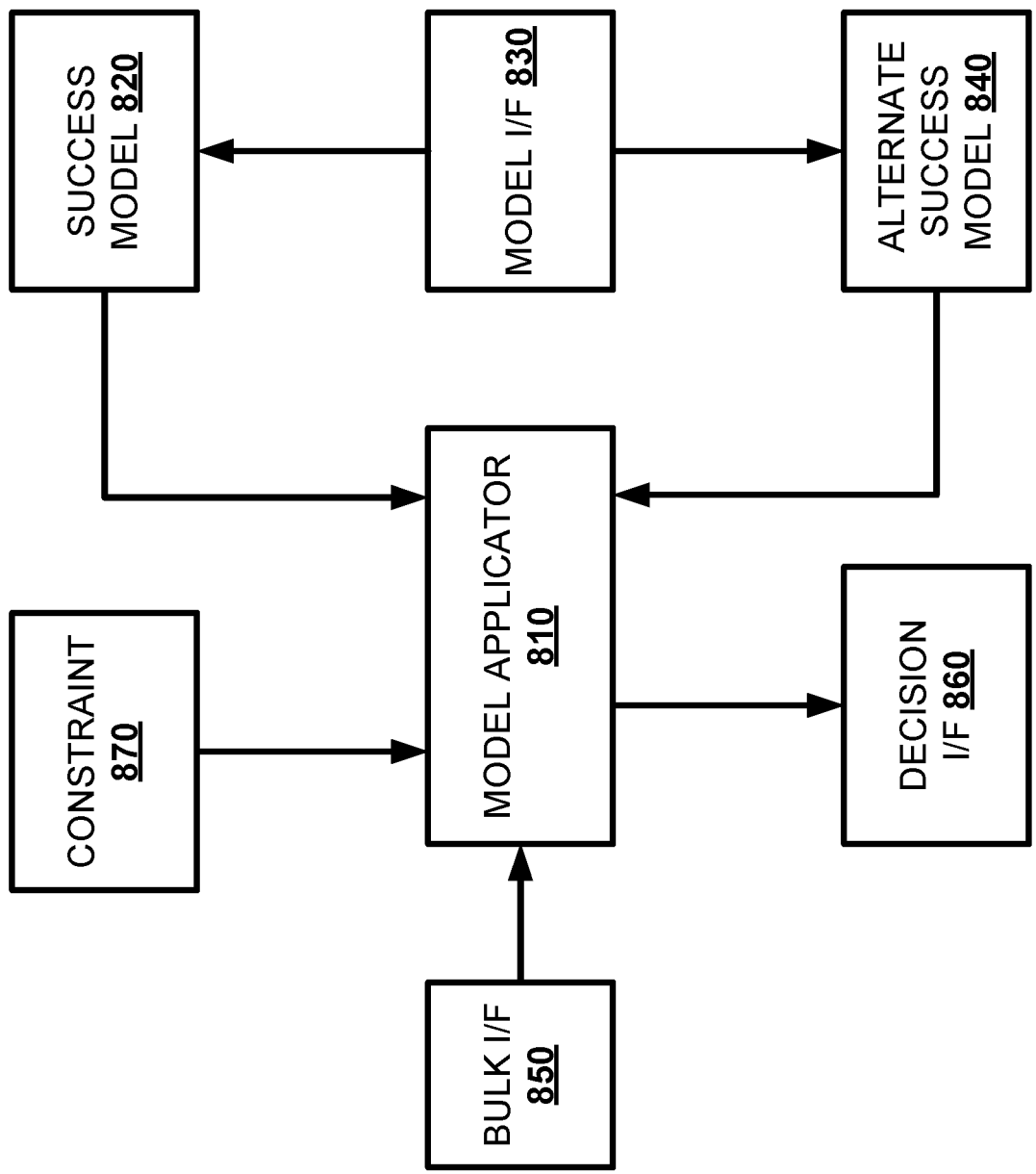
FIG. 8 illustrates, in a block diagram, one example of a dispute decision module.

FIG. 8 illustrates, in a block diagram, one example of a dispute decision module 800. The dispute decision module 800 may have a model applicator 810 that applies a dispute success model 820 received via a model interface 830 from the model generation module. The model applicator 810 may also receive an alternate dispute success model 840 via the model interface 830.

The model applicator 810 may receive a set of disputes, such as chargebacks, over a given period via a bulk data interface 850. The model applicator 810 may determine the bandwidth for the bulk dispute challenge system, representing the number of disputes that may be processed over the given period. The model applicator 810 may apply the dispute success model 820 or the alternate dispute success model 840 to the dispute set. The model applicator 810 may send a set of disputes to the dispute moderating party, such as the credit service, via a decision interface 860. The model applicator 810 may void any dispute challenge in the dispute challenge set based on an administrative constraint 870. The administrative constraint 870 may take into account non-profit factors to determine whether to send the dispute challenge, such as public relations considerations and others. The model applicator 810 may factor return of investment on the dispute, representing a value received from winning the dispute minus any resources expended to win the dispute. Additionally, the model applicator 810 may factor in the bandwidth consumption for the dispute.

Figure 9:
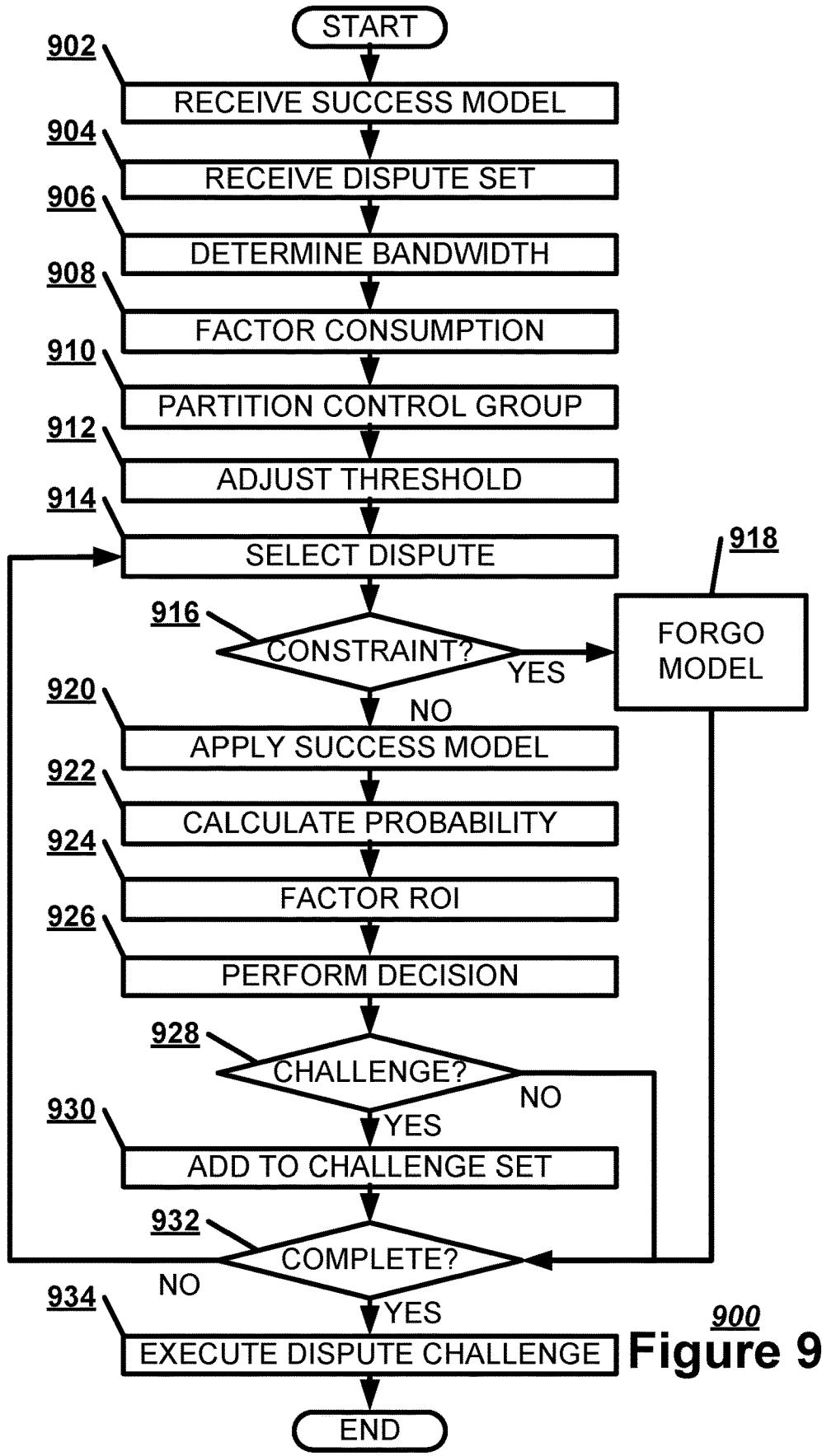
FIG. 9 illustrates, in a flowchart, one example of a method of deciding on challenging a dispute based on a dispute success model.

FIG. 9 illustrates, in a flowchart, one example of a method 900 of deciding on challenging a dispute based on a dispute success model. The dispute decision module may receive a dispute success model that calculates a predicted probability of success for disputes generated by applying a machine learning model to a training data set featuring multiple attributes describing data characteristics of disputed events (Block 902). The dispute decision module may receive a dispute set representing a group of disputes from a dispute moderating party received over a given period, such as a chargeback set representing a group of chargebacks from a credit service received over a day (Block 904). The dispute decision module may determine the bandwidth for the bulk dispute challenge system, representing the number of disputes that bulk dispute challenge system may handle for that period (Block 906). The dispute decision module may factor the bandwidth consumption of each dispute, possibly organizing the dispute set so that disputes that consume the least resources are processed earlier (Block 908). The dispute decision module may partition a control group from the dispute set, selecting a random group of disputes to challenge to act as a control group (Block 910). The dispute decision module may adjust a challenge threshold for determining whether to challenge a dispute based on a bandwidth determination (Block 912).

The dispute decision module may select a dispute from the dispute set (Block 914). If the dispute has a feature that matches an administrative constraint (Block 916), the dispute decision module may forgo application of the dispute success model (Block 918). The dispute decision module may apply the dispute success model to the dispute of the dispute set (Block 920. The dispute decision module may calculate a predicted probability of success for a dispute challenge (Block 922). The dispute decision module may factor the return on investment (ROI) for the dispute challenge, combining the predicted probability of success with the return on investment based on the formula enumerated above (Block 924). The dispute decision module may perform a dispute decision for the dispute challenge based in part on applying the challenge threshold to the predicted probability of success combined with the return on investment (Block 926). If the dispute decision indicates a challenge is worthwhile (Block 928), the dispute decision module may add the dispute to the dispute challenge set based on the dispute decision (Block 930). If the complete chargeback set has been processed (Block 932), the dispute decision set may execute the dispute challenge set to the dispute set based on the dispute decisions (Block 934)

Figure 10:
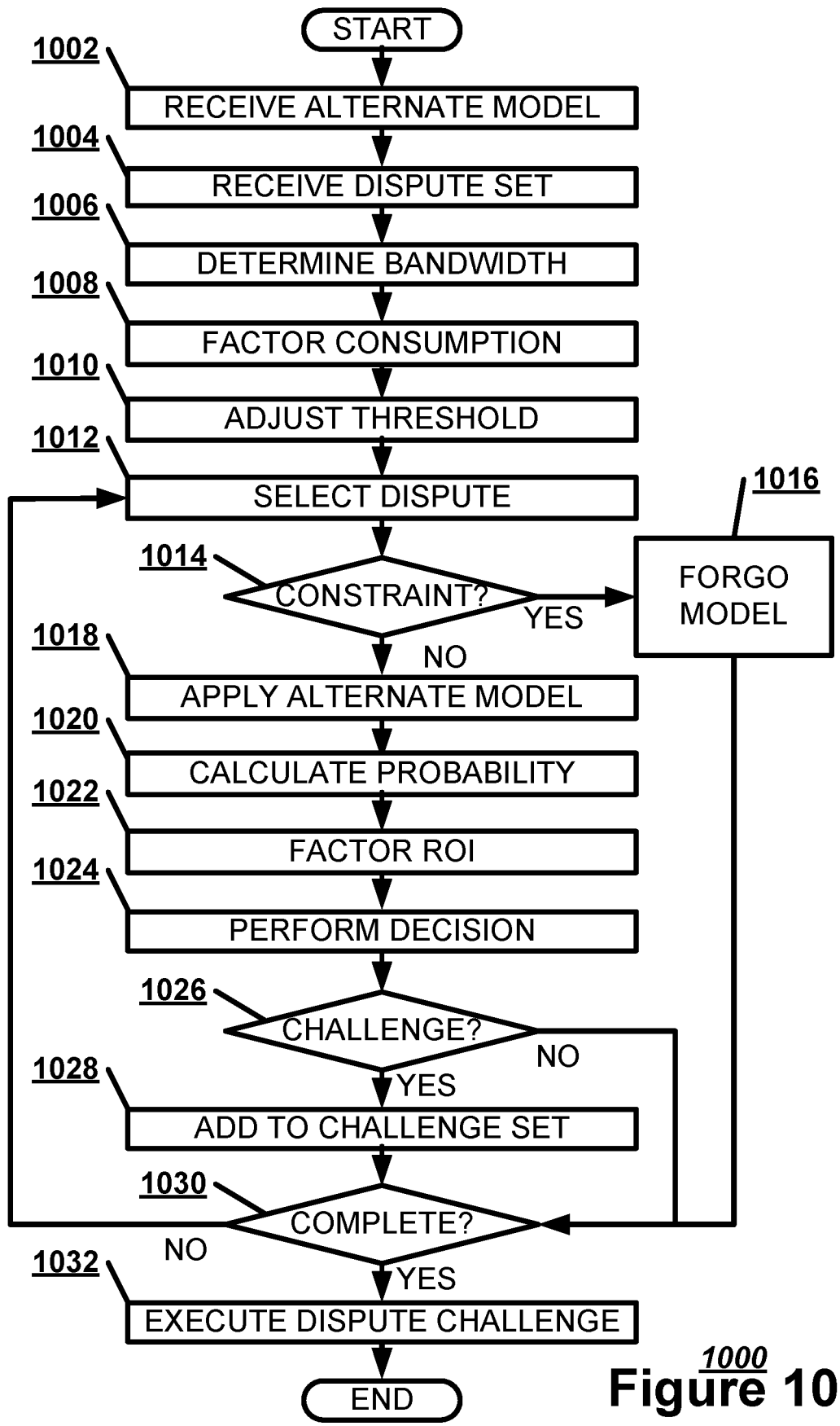
FIG. 10 illustrates, in a flowchart, one example of a method of deciding on challenging a dispute based on an alternate dispute success model.

FIG. 10 illustrates, in a flowchart, one example of a method 1000 of deciding on a chargeback dispute based on an alternate dispute success model. The dispute decision module may receive an alternate dispute success model that calculates an alternate predicted probability of success for disputes generated by applying an alternate machine learning model to a training data set featuring multiple attributes describing data characteristics of disputed events (Block 1002). The dispute decision module may receive a dispute set representing a group of disputes from a dispute moderating party received over a given period, such as a chargeback set representing a group of chargebacks from a credit service received over a day (Block 1004). The dispute decision module may determine the bandwidth for the bulk dispute challenge system, representing the number of disputes that bulk dispute challenge system may handle for that period (Block 1006). The dispute decision module may factor the bandwidth consumption of each challenge to the dispute, possibly organizing the dispute set so that disputes that consume the least resources are processed earlier (Block 1008). The dispute decision module may adjust a challenge threshold for determining whether to challenge a dispute based on a bandwidth determination (Block 1010).

The dispute decision module may select a dispute from the dispute set (Block 1012). If the dispute has a feature that matches an administrative constraint (Block 1014), the dispute decision module may forgo application of the alternate dispute success model (Block 1016). The dispute decision module may apply the alternate dispute success model to the chargeback (Block 1018). The dispute decision module may calculate a predicted probability of success for a dispute challenge to the dispute (Block 1020). The dispute decision module may factor the return on investment (ROI) for the dispute challenge, combining the predicted probability of success with the return on investment based on the formula enumerated above (Block 1022). The dispute decision module may perform a dispute decision for the dispute based in part on applying the challenge threshold to the predicted probability of success combined with the return on investment (Block 1024). If the dispute decision indicates a challenge is worthwhile (Block 1026), the dispute decision module may add the dispute to the dispute challenge set based on the dispute decision (Block 1028). If the complete dispute set has been processed (Block 1030), the dispute decision set may execute the dispute challenge set to the dispute set based on the dispute decisions (Block 1032)

Figure 11:
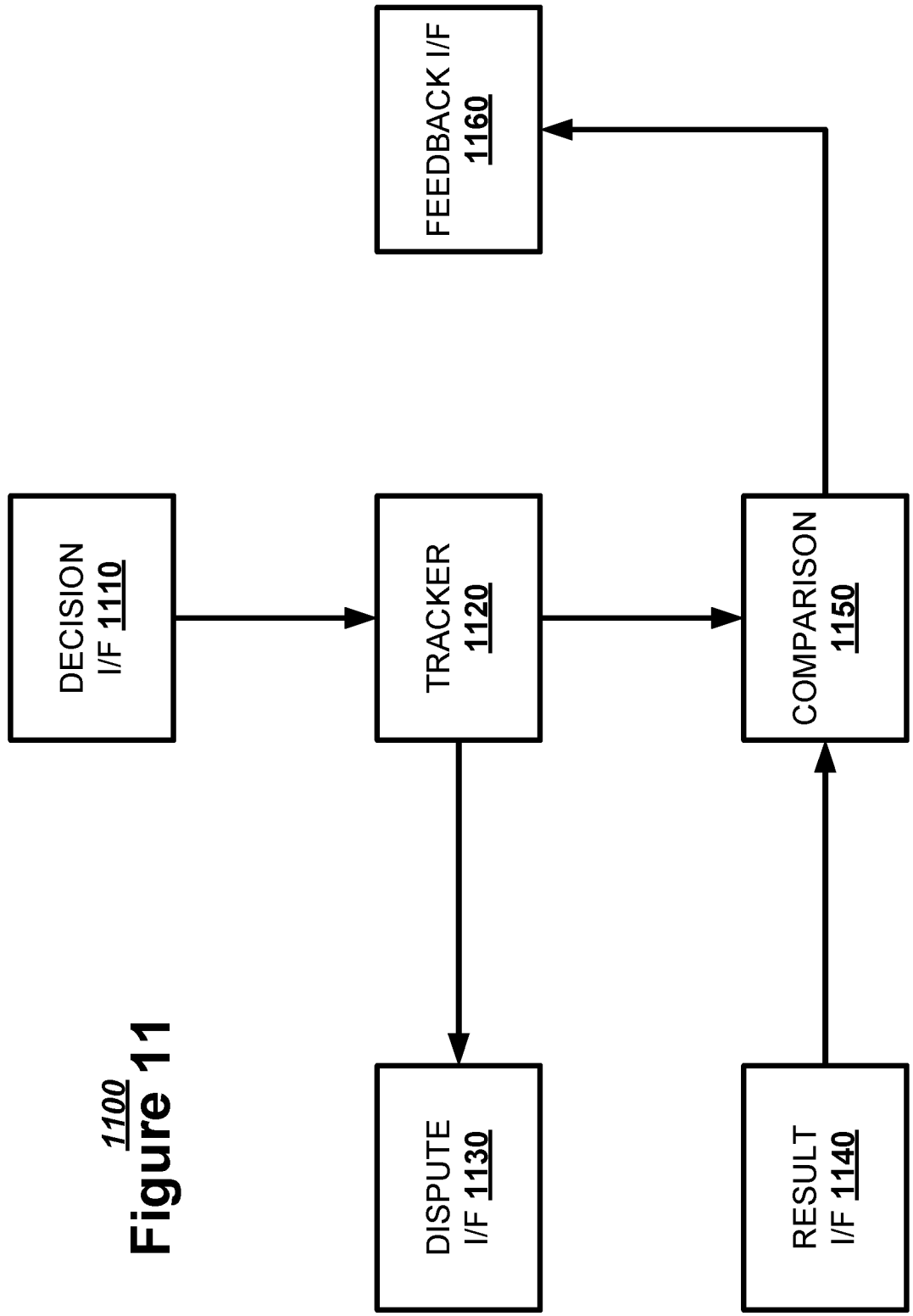
FIG. 11 illustrates, in a block diagram, one example of a dispute tracking module.

FIG. 11 illustrates, in a block diagram, one example of a tracking module 1100. The tracking module 1100 may intercept via a decision interface 1110 a dispute challenge set. A tracker memory 1120 may track the dispute challenge set during transference to the dispute moderating party via a dispute interface 1130. The tracking module 1100 may receive a dispute result set from the dispute moderating party via a result interface 1140. The tracking module 1100 may execute a comparison function 1150 of the predicted probability of success to an actual success rate. The tracking module 1100 may use the comparison to generate a feedback result to send to the model generation module for updating the dispute success model via a feedback interface 1160.

Figure 12:
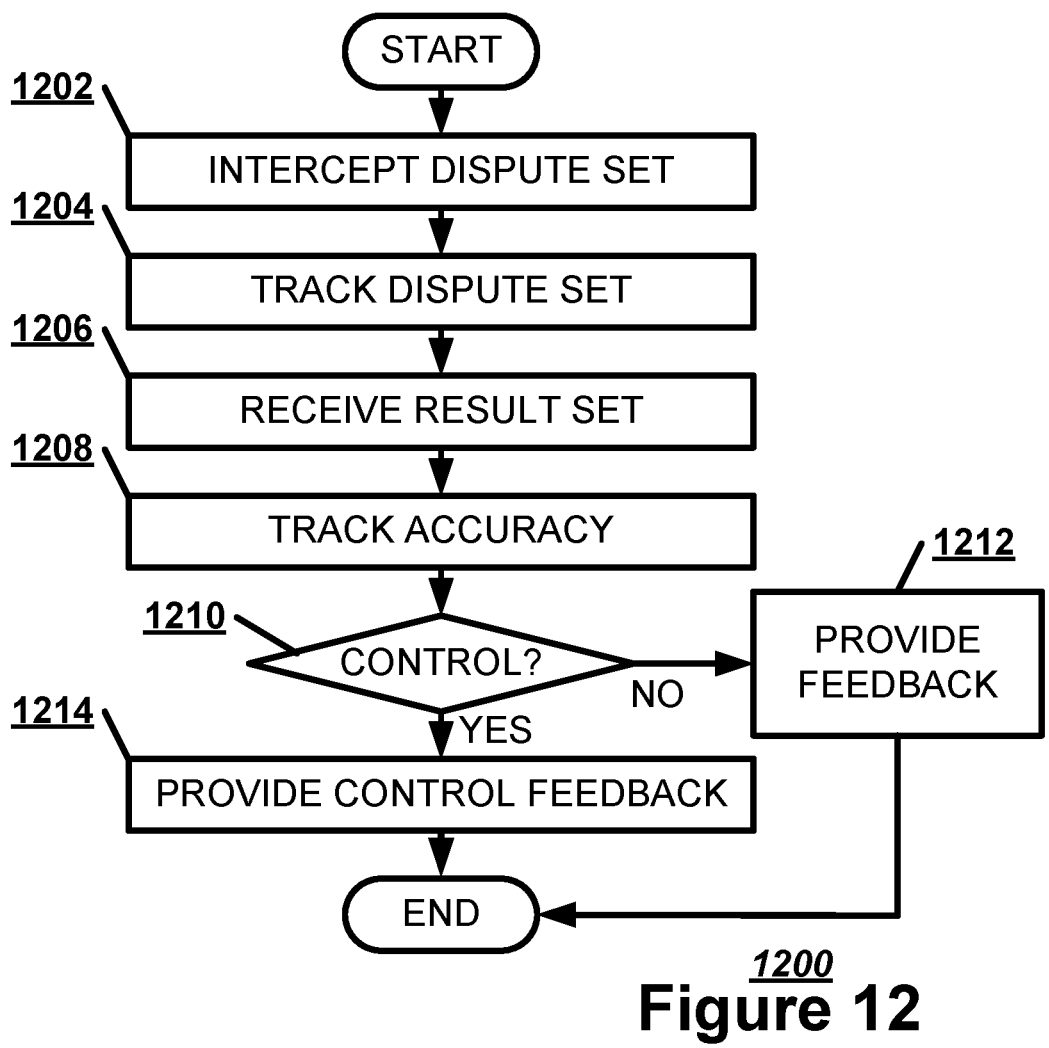
FIG. 12 illustrates, in a flowchart, one example of a method of tracking a dispute based on a dispute success model.

FIG. 12 illustrates, in a flowchart, one example of a method 1200 of tracking a chargeback dispute set based on a dispute success model. The tracking module may intercept a dispute challenge set from the dispute decision module (Block 1202). The tracking module may track the dispute challenge before transference to the dispute moderating party (Block 1204). The tracking module may receive a dispute result set from the dispute moderating party (Block 1206). The tracking module may track an accuracy rate for the dispute success model by comparing the predicted probability of success to an actual success rate (Block 1208). If the dispute was a regular dispute (Block 1210), the tracking module may provide a dispute feedback to update the dispute success model (Block 1212). Otherwise, if the dispute was a control dispute (Block 1210), the tracking module may provide a control dispute feedback to update the dispute success model (Block 1214).

Figure 13:
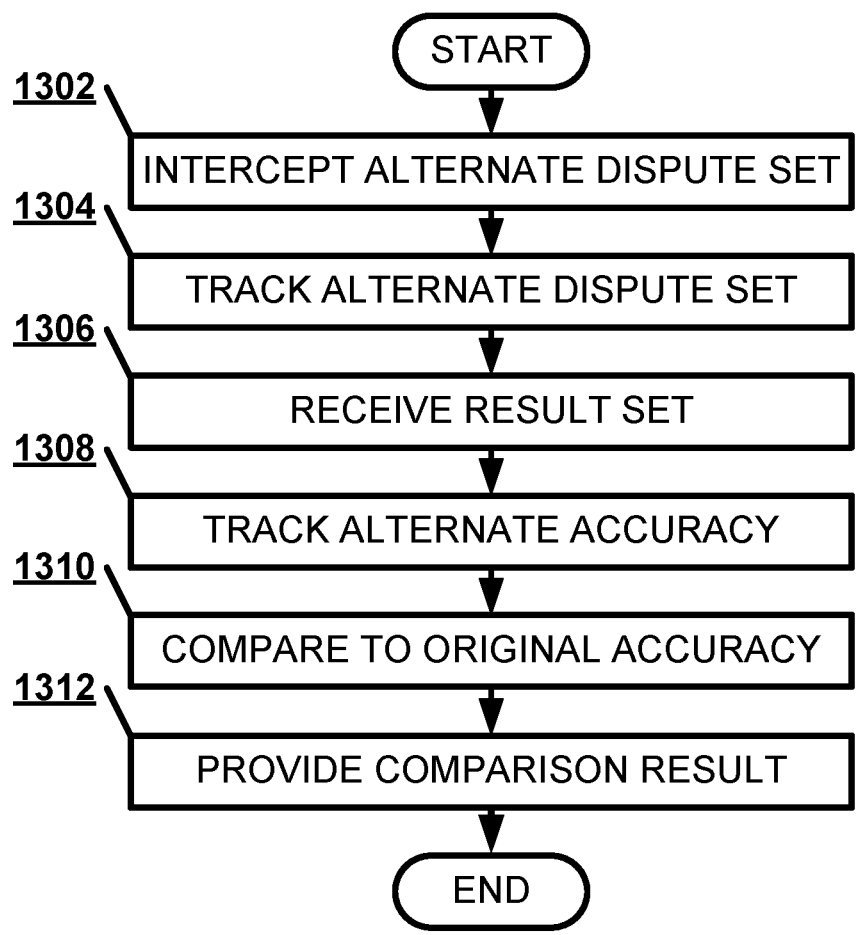
FIG. 13 illustrates, in a flowchart, one example of a method of tracking a dispute based on an alternate dispute success model.

FIG. 13 illustrates, in a flowchart, one example of a method 1300 of tracking a chargeback dispute based on an alternate dispute success model. The tracking module may intercept a dispute challenge set based on the alternate dispute success model from the dispute decision module (Block 1302). The tracking module may track the dispute challenge set during transference to the credit service (Block 1304). The tracking module may receive a dispute result set from the dispute moderating party (Block 1306). The tracking module may track an alternate accuracy rate for the alternate dispute success model by comparing the alternate predicted probability of success to an actual success rate (Block 1308). The tracking module may compare an accuracy rate for a dispute success model to an alternate accuracy rate for an alternate dispute success model (Block 1310). The tracking module may provide a comparison result to update the alternate dispute success model. (Block 1312).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A bulk dispute challenge system, comprising:
   a data interface configured to receive a training data set featuring multiple attributes describing data characteristics selected from a historical dispute data set describing disputed events;
   at least one hardware processor configured to
     execute, via the at least one hardware processor, a model generation module configured to apply a machine learning model to the training data set to generate a dispute success model that calculates a predicted probability of success for disputes based on the multiple attributes, the machine learning model comprising one or more of a classification and regression tree model, a logistic regression model, a support vector machine model, a random forest model, or a gradient boosting machine model, and
     execute, via the at least one hardware processor, a dispute decision module configured to receive, via the data interface, a dispute set, apply the dispute success model to a dispute of the dispute set to calculate a predicted probability of success for a dispute challenge to the dispute, and determine a dispute decision for the dispute based in part on the predicted probability of success by applying a challenge threshold to the predicted probability of success combined with a dispute return of investment; and
   a communication interface configured to send to a dispute moderating party the dispute challenge against the dispute based on the dispute decision.

2. The bulk dispute challenge system of claim 1, wherein the model generation module is further configured to update the dispute success model based on an accuracy rate.

3. The bulk dispute challenge system of claim 1, wherein the model generation module is further configured to determine an impact factor for an attribute of the multiple attributes describing an impact of the attribute on a resulting determination.

4. The bulk dispute challenge system of claim 1, wherein the model generation module is further configured to prune an attribute of the multiple attributes from consideration in the dispute success model based on a low impact factor.

5. The bulk dispute challenge system of claim 1, wherein the model generation module is further configured to add a previously pruned attribute of the multiple attributes back into consideration for the dispute success model to determine whether an impact factor for the pruned attribute has changed.

6. The bulk dispute challenge system of claim 1, wherein the model generation module is further configured to update the dispute success model based on a control dispute result.

7. The bulk dispute challenge system of claim 1, further comprising:
   a memory configured to track an accuracy rate for the dispute success model by comparing the predicted probability of success to an actual success rate.

8. The bulk dispute challenge system of claim 1, wherein the at least one hardware processor is further configured to execute a tracking module to compare an accuracy rate for the dispute success model to an alternate accuracy rate for an alternate dispute success model.

9. The bulk dispute challenge system of claim 1, wherein the dispute decision module is further configured to factor a bandwidth consumption into the dispute decision.

10. The bulk dispute challenge system of claim 1, wherein the dispute decision module is further configured to adjust the challenge threshold for the predicted probability of success based on a bandwidth estimate.

11. The bulk dispute challenge system of claim 1, wherein the dispute decision module is further configured to forgo the dispute challenge based on an administrative constraint.

12. The bulk dispute challenge system of claim 1, wherein the dispute decision module is further configured to partition a control group within the dispute set.

13. A computing device, having a processor and memory comprising a series of instructions executable by the processor to:
   select a training data set featuring multiple attributes describing data characteristics from a historical dispute data set describing disputed events;

apply a machine learning model to the training data set to generate a dispute success model configured to calculate a predicted probability of success for disputes based upon the multiple attributes, the machine learning model comprising one or more of a classification and regression tree model, a logistic regression model, a support vector machine model, a random forest model, or a gradient boosting machine model;

create the dispute success model that calculates a predicted probability of success for dispute challenges based on the multiple attributes;

provide the dispute success model to a dispute decision module to use in determining whether to challenge a dispute based on the predicted probability of success by applying a challenge threshold to the predicted probability of success combined with a dispute return of investment, the dispute decision module being configured to receive, via a data interface, a dispute set comprising the dispute, and the challenge threshold being applied to determine a dispute decision comprising a decision regarding whether to challenge the dispute;

based upon the dispute decision, send the dispute to a dispute moderating party; and update the dispute success model based on an accuracy rate.

14. The computing device of claim 13, wherein the computing device is further configured to track the accuracy rate for the dispute success model by comparing the predicted probability of success to an actual success rate.

15. The computing device of claim 13, wherein the computing device is further configured to determine an impact factor for an attribute of the multiple attributes describing an impact of the attribute on a resulting determination.

16. The computing device of claim 13, wherein the computing device is further configured to prune an attribute of the multiple attributes from consideration in the dispute success model based on a low impact factor.

17. On a computing device, a machine-implemented method, the method comprising:

receiving, on the computing device, a dispute success model that calculates, by execution of the model on the computing device, a predicted probability of success for disputes generated by applying a machine learning model to a training data set featuring multiple attributes describing data characteristics of disputed events, the machine learning model comprising one or more of a classification and regression tree model, a logistic regression model, a support vector machine model, a random forest model, or a gradient boosting machine model, and the machine learning model having been trained by application of the machine learning model to a training data set comprising the multiple attributes to generate the dispute success model;

receiving, on the computing device, a dispute set;

applying, on the computing device, the dispute success model to a dispute of the dispute set;

calculating a predicted probability of success for a dispute challenge;

performing, on the computing device, a dispute decision for the dispute based in part on the predicted probability of success by applying a challenge threshold to the predicted probability of success combined with a dispute return of investment; and executing, on the computing device, the dispute challenge to the dispute based on the dispute decision and the dispute return on investment.

18. The method of claim 17, further comprising:

providing a control dispute feedback to update the dispute success model.

\* \* \* \* \*